F. KRAMER.
JOURNAL BEARING.
APPLICATION FILED APR. 14, 1917.
1,279,881.
Patented Sept. 24, 1918.
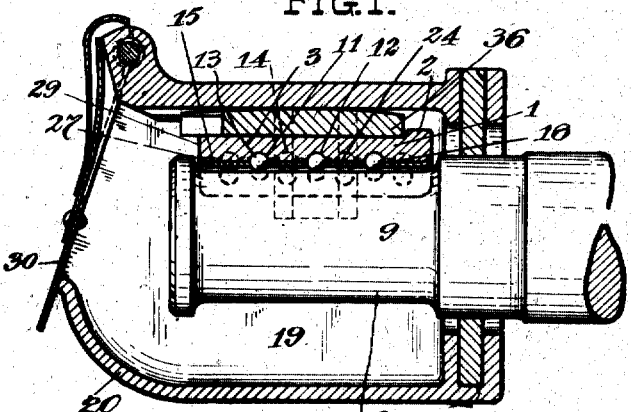
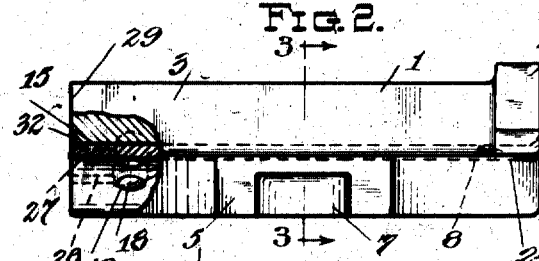
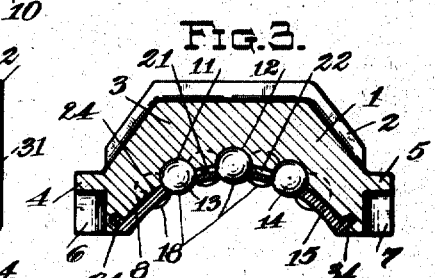
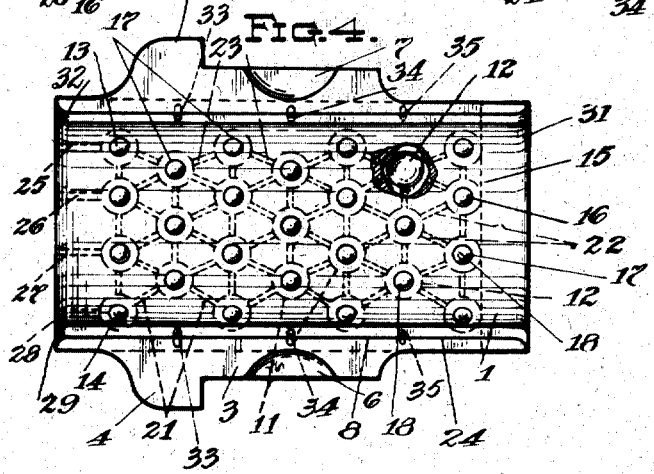
FRITZ KRAMER.
*INVENTOR.*
BY William A. Kirtle,
*ATTORNEY.*

UNITED STATES PATENT OFFICE.

FRITZ KRAMER, OF BLYTHEDALE, PENNSYLVANIA.

JOURNAL-BEARING.

1,279,881.  Specification of Letters Patent.  Patented Sept. 24, 1918.

Application filed April 14, 1917. Serial No. 162,151.

*To all whom it may concern:*

Be it known that I, FRITZ KRAMER, a citizen of the United States of America, residing at Blythedale, in the county of Allegheny and State of Pennsylvania, have invented certain new and useful Improvements in Journal-Bearings, of which the following is a specification.

The present invention relates to improvements in journal-bearings and more particularly to that type of bearing used in connection with railroad cars, and is designed to prevent the overheating of the car journals by means of a specially constructed bearing having balls therein in order to reduce the friction, between the journal and its bearing.

In my form of bearing the usual type of journal bearing is used with the addition of a Babbitt metal support having means for suspending the balls used, and provision is also made for depressions or sockets formed in the under wall surface of the usual brass bearing plate in which the balls can freely rotate.

A convenient oiling means is provided whereby each and every ball may receive sufficient lubrication to prevent any tendency to overheating, which is the primary object of the invention described herein.

In the accompanying drawings forming part of this specification I have shown one complete example of the physical embodiment of my invention constructed according to the best mode I have so far devised for the practical application of the principles of my invention.

Figure 1 is a central vertical section of a journal-box, journal and associated parts with my form of bearing in position, as used in connection with the ordinary railroad car journals.

Fig. 2 is a side elevation of my invention.

Fig. 3 is a cross-sectional view of the invention taken on line 3—3 of Fig. 2.

Fig. 4 is a bottom plan view of the bearing shown in Fig. 2.

The numeral 1 indicates a brass or metal journal-bearing of the standard type as found in use on railroad cars, having the upturned lip 2, body portion 3, and the usual projections 4, 5 and the side cavities 6 and 7.

The concave portion 8 of the bearing 1, which is usually found in contact with the surface 9 of the journal 10, is provided in my type of bearing with a plurality of semi-spherical depressions 11, 12, etc., preferably in staggered alinement as shown in Fig. 4 of the drawings. The depressions 11, 12, etc., are adapted to receive the upper portions of the steel balls 13, 14, etc., as shown.

An inner casing 15 preferably made of Babbitt metal and conforming in shape with the inner side or concave portion 8 of the bearing 1 is used, the said casing 15 having a plurality of holes 16, 17, etc., of a diameter slightly smaller than the diameter of the balls 13, 14, etc., and spaced to register with the depressions 11, 12, etc., of the bearing 1. The casing 15 it is readily seen retains the balls in their proper relative positions with a small portion of their spherical surfaces 18 protruding through the holes 16, 17, etc., thus holding the balls 13, 14, etc., in direct contact with the surface 9 of the journal 10 when in operative position thereon as shown in Fig. 1.

In addition to the usual method of oiling the journal by means of oiled "waste" which is placed in the interior cavity 19 of the journal-box 20, a means is provided in my invention for oiling the balls 13, 14, etc., consisting of a network or system of comparatively short recesses 21, 22, 23, formed in the inner surfaces 24 of the Babbitt metal casing 15, and adjacent to the under surface of the concave portion 8 of the bearing 1. These recesses as is readily seen from the drawings connect the various depressions 11, 12, etc., so that each ball within the said depressions may receive a proper share of the lubrication supplied to the recesses. Entrance ducts 25, 26, 27, and 28 are formed in the casing 15 extending to the end 29 of the bearing 1, so that oil may be supplied to the system of recesses 21, 22, etc. As is evident from Fig. 1 of the drawings, the ducts 25, 26, etc., are accessible for oiling purposes when the lid 30 of the journal-box 20 is in lifted or open position.

The Babbitt metal casing 15 is flared upwardly and outwardly at both ends as shown at 31 and 32, and is also provided with projections 33, 34, 35 which fit into complementary depressions in the concave portion 8 of the bearing 1, thus making the position of the casing secure against rotary or longitudinal displacement within the concavity of said bearing 1, as is readily appreciated.

The method of using my form of journal-bearing in practice is apparent from the above description taken in connection with the drawings, the view shown in Fig. 1 clearly showing the journal 10, the journal-box 20, the bearing member 1 the usual wedge 36, the lid 30, Babbitt metal casing 15, and the balls 13, 14, etc., all in assembled and operative positions.

It is seen that as the journal 10 revolves and reaches a considerable speed of revolution that according to well understood scientific principles the total load or pressure between the bearing member 1, and the journal 10 becomes practically a negligible friction factor in so far as same forms an impediment to the rotation of the balls 13, 14, etc., in their sockets 11, 12, etc. The balls 13, 14, etc., impelled by the surface irregularities of the journal 10 itself, the fluid friction of the lubricant used, and the vibration incident to railroad travel, are intermittently and almost constantly "spun" around in their sockets 11, 12, etc. In this way fresh unheated contacting surfaces of both the balls, and the journal are constantly being brought into service, the production of frictional heat retarded or reduced to a negligible quantity, and what are usually termed "hot boxes" on railroad cars thereby prevented.

It is evident that I have provided a journal-bearing which is readily constructed with small extra expense and few changes to the journal-bearings as at present in use on railroad cars, which can be taken apart, and reassembled with ease, in addition to the other desirable features above set forth.

What I claim is:—

1. A journal-bearing device comprising a journal-bearing member having on its under curved surface a plurality of semi-spherical depressions formed therein, a number of balls adapted to revolve in said depressions, an inner ball-retaining casing seated in said journal-bearing member, and means formed in the casing and registering with the aforesaid depressions for holding said balls in their relative positions with a portion of their spherical surfaces protruding through said inner casing and thereby providing a series of ball-bearing surfaces for a journal.

2. A journal-bearing device comprising a journal-bearing member having on its under curved surface a plurality of semi-spherical depressions, an inner casing conforming to the curved surface of the journal-bearing member, and having a number of complementary holes and sockets registering with the aforesaid depressions in the latter, a number of balls revolubly positioned in the chambers formed by the said depressions, and sockets of the casing, and having a portion of their spherical surfaces protruding through the holes in the said casing, coacting means formed in the journal-bearing member and on the inner casing for preventing displacement of the latter with relation to the former, means formed in the casing for lubricating said balls consisting of a series of grooves connecting the casing sockets with each other and with the end of said inner casing, whereby the balls may be lubricated.

3. The combination of a journal-bearing member having a curved under surface with a plurality of ball-shaped depressions formed therein, an inner casing having outwardly and upwardly flared ends, conforming in shape to the under surface of the journal-bearing member, a number of complementary sockets having holes therethrough formed in the inner casing and registering with the aforesaid ball-shaped depressions in the first mentioned member whereby a ball-retaining chamber is provided, balls positioned in said chambers having a portion of their spherical surfaces projecting through the inner casing, means for preventing displacement of the inner casing within the journal-bearing member, a series of grooves formed in the upper surface of said casing connecting the ball-retaining chambers with each other, and means for supplying oil to the said grooves and balls aforesaid.

In testimony whereof I affix my signature in the presence of two witnesses.

FRITZ KRAMER.

Witnesses:
JOHN F. SWEENY,
T. STRAN JONES.